3,345,157
HERBICIDAL COMPOSITION AND METHOD
Sidney B. Richter, Chicago, Ill., assignor to Velsicol Chemical Corporation, Chicago, Ill., a corporation of Illinois
No Drawing. Filed Sept. 12, 1966, Ser. No. 578,478
2 Claims. (Cl. 71—111)

ABSTRACT OF THE DISCLOSURE

A herbicidal composition comprising an inert carrier and at least about 5% by weight, a compound selected from the group consisting of 2-methoxy-3,6-dichloro-5-aminobenzoic acid, its esters in which the esterifying group is an unsubstituted alkyl group which contains from 1 to 10 carbon atoms, its alkali metal salts and its amine salts in which the amine component contains up to 6 carbon atoms and a method of using said composition to destroy undesirable plants.

---

This application is a continuation-in-part of application Ser. No. 370,057, filed May 25, 1964, which is a division of application Ser. No. 146,444, filed Oct. 20, 1961, both now abandoned.

This invention relates to new herbicidal compositions of matter. More specifically, this invention relates to the control of undesirable plant life with 2-methoxy-3,6-dichloro-5-aminobenzoic acid, its esters, its alkali metal salts, or its amine salts. 2-methoxy-3,6-dichloro-5-aminobenzoic acid, which has the structure

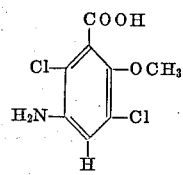

will hereinafter be referred to as compound I. This chemical compound and its derivatives as cited above have marked activity as herbicides useful for the control of undesirable plant life.

Compound I can be prepared readily, for example, in a three step process from 3,6-dichlorosalicylic acid, which can also be named 2-hydroxy-3,6-dichlorobenzoic acid. 3,6-dichlorosalicylic acid is converted to 2-methoxy-3,6-dichlorobenzoic acid by treatment with dimethyl sulfate. The 2-methoxy-3,6-dichlorobenzoic acid is then treated with nitric acid to give 2-methoxy-3,6-dichloro-5-nitrobenzoic acid, which can be converted to the desired 2-methoxy-3,6-dichloro-5-aminobenzoic by hydrogenation.

More particularly, the 3,6-dichlorosalicylic acid is first converted to its alkali metal salt by treatment with aqueous solution of an alkali metal hydroxide. The alkali metal salt of 3,6-dichlorosalicylic acid is reacted at reflux with an excess of dimethyl sulfate. The methylation reaction mixture is further treated by refluxing in an aqueous solution of alkali metal hydroxide to hydrolyze any carboxylic acid ester which may have formed during the methylation reaction. The cooled reaction mixture is acidified with a mineral acid, such as hydrochloric acid, and the solid 2-methoxy-3,6-dichlorobenzoic acid filtered off and washed with cold water.

The 2-methoxy-3,6-dichlorobenzoic acid is dissolved in sulfuric acid, cooled, and treated with 70% nitric acid. The cooled mixture is poured over ice to yield 2-methoxy-3,6-dichloro-5-nitrobenzoic acid which can be filtered from the aqueous mixture, and can be purified by crystallization from a toluene-hexane mixture, if desired.

The 2-methoxy-5-nitro-3,6-dichlorobenzoic acid is then hydrogenated with hydrogen gas in the presence of a hydrogenation catalyst, such as activated nickel, palladium, platinum, and the like, to yield compound I. The hydrogenation is conveniently performed at normal room temperature in a relatively inert solvent or diluent such as a lower alcohol. After the hydrogenation is complete, the catalyst is separated from the solution, from which the solvent is then removed by distillation in vacuo to yield solid crystals of compound I. The compound I obtained in this manner is suitable for many herbicidal uses as such, but if desired it can be purified, for example, by crystallization from a suitable solvent.

Compounds which are salts of compound I can be prepared readily from the free acid. Thus, treatment of the free acid with ammonium hydroxide gives a product which is the salt ammonium 2-methoxy-3,6-dichloro-5-aminobenzoate. Similarly, an alkali metal salt of compound I can be made by the treatment of the free acid with bases, such as the hydroxides of alkali metals. Treatment of the acid with sodium hydroxide thus gives the salt sodium 2-methoxy-3,6-dichloro-5-aminobenzoate as the product, while the use of potassium hydroxide gives the salt potassium 2-methoxy-3,6-dichloro-5-aminobenzoate.

Amine salts of compound I are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamine, trimethylamine, triethylamine, diethanolamine, triethanolamine, isopropylamine, and morpholine salts of 2-methoxy-3,6-dichloro-5-aminobenzoic acid. While other amines can be used to prepare the corresponding amine salts, it is preferred to utilize the lower alkylamines and alkanolamines.

Esters of compound I can be prepared, for example, by the condensation of the acid with various alcohols, or by condensation of the intermediate 2-methoxy-3,6-dichloro-5-nitrobenzoic acid with various alcohols, followed by hydrogenation in the presence of tin and hydrochloric acid. Thus, the condensation of methyl alcohol with compound I gives the desired ester, methyl 2-methoxy-3,6-dichloro-5-aminobenzoate. Other typical alcohols which can be used are propyl, isopropyl, n-butyl, sec-butyl, isobutyl, tert-butyl, amyl, hexyl, heptyl, octyl, nonyl, decyl, and the like. The products are the corresponding alkyl esters of 2-methoxy-3,6-dichloro-5-aminobenzoic acid. Although such complex esters as those prepared by the esterification of the intermediate acid with butoxyethanol, propylene glycol butyl ether, tert-octyl alcohol, 3-(2-butoxyethoxy)-propyl alcohol, tetrahydrofurfuryl alcohol, and the like are useful products in accordance with this invention, preferred esters are those in which the esterifying group is an unsubstituted alkyl group which contains from 1 to 10 carbon atoms. The condensation of the intermediate acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously in many cases from the reaction mixture by distillation as it forms, and its volume can be measured to determine when the esterification is complete. The intermediate ester is then isolated by distillation of the inert solvent and hydrogenated in the presence of tin and dry hydrogen chloride gas dissolved in alcohol to yield the desired ester of compound I.

The condensation of compound I with the various alcohols is carried out by dissolving the free acid in the alcohol, passing in dry hydrogen chloride gas until the solution is saturated, and after several hours, recovering the desired ester by adding aqueous sodium carbonate solution thereto. The desired ester is then washed with water and dried.

For practical use as herbicides, the compounds of this invention are formulated with inert carriers to obtain proper concentrations and to facilitate handling. For example, these compounds can be formulated into dusts by combining them with such inert substances as talcs or clays. The alkali metal salts of compound I are particularly suited to such dust formulations, and dusts containing from 5 to 25 percent by weight of active compound are convenient for use in the field. The compounds of this invention, however, are preferably applied as sprays. These can be made as simple solutions by dissolving the compounds in organic solvents such as xylene, kerosene, or the methylated napththalenes. The esters of compound I, which ordinarily are liquids at room temperature, are particularly suited to formulation by this method. The amine salts of compound I often show good solubility in water and can be used directly as aqueous solutions.

The compounds of this invention can also be emulsified or suspended in water by the addition of emulsifiers and wetting agents. The formulations of these active herbicidal compounds are either applied directly to the plants to be controlled, or the soil in which the plants are growing can be treated. Substances such as other pesticides, stabilizers, activators, synergists, spreaders and adhesives can be added to the formulations if desired. There is no significant difference in effect from the amount of water or organic solvent for diluting these herbicides, providing the same amount of chemical is distributed evenly over a given area. Such distribution can be obtained, for example, with low-pressure, low-volume sprays at the rate of about 10 gallons of spray per acre.

In applying the herbicidal compounds consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older weeds, the higher the concentration needed to kill them. Summer annuals should be sprayed when they are less than 4 inches high. Winter annuals are most easily killed while they are still in the rosette stage. Usually weeds growing rapidly under optimum conditions are relatively susceptible, whereas those growing under adverse conditions tend to be resistant to the herbicide sprays.

Exemplary of the more important weeds requiring effective weed control are lamb's-quarters, pigweeds, cocklebur, sunflower, mustards, fan weed, yellow star thistle, wild radish, French weed, crabgrass, yellow foxtail, ryegrass, chickweed, and white cockle.

The effectiveness of the compounds of this invention in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of compounds to be used depends on a variety of factors but is influenced primarily by the species of undesirable plant to be controlled. Thus, while fractions of a pound of actual compound I or its equivalent of an ester, or salt, of compound I are often sufficient for post-emergence weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush, and the like may require the use of one or more pounds of compound I or its derivatives per acre for good control. Dosage adjustments with the low-volume, low-pressure applications suggested can be made by changing the nozzle size, nozzle spacing, pressure, or traveling rate of the spray equipment.

The manner in which the herbicidal compounds of this invention can be prepared and utilized is illustrated in the following examples:

EXAMPLE 1

*Preparation of 2-methoxy-3,6-dichlorobenzoic acid*

3,6 - dichlorosalicylic acid (210 g.; 0.87 mole) prepared as described in German Patent 537,453, Apr. 4, 1930, was dissolved in a solution of sodium hydroxide (139 g.; 3.48 moles) in 900 ml. water. The solution was cooled to 20° C., and dimethyl sulfate (219 g.; 1.74 moles) was added to the vigorously stirred solution. The mixture was stirred for 20 minutes while the temperature was maintained below 35° C. by ice-cooling. Another portion of dimethyl sulfate (139 g.) was added, and the mixture was stirred for 10 minutes while the temperature was maintained below 45° C. The mixture was then refluxed for 2 hours, treated with a solution of 69.6 g. (1.74 moles) of sodium hydroxide in 250 ml. water, and refluxed for an additional 2 hours. The cooled reaction mixture was acidified to Congo red with hydrochloric acid. The precipitated solid was filtered, dissolved in diethyl ether, dried over magnesium sulfate, and filtered. Removal of the ether in vacuo gave a viscous oil, which when dried to a solid at room temperature in a vacuum oven, washed with cold pentane and again dried gave a pale yellow solid melting at 113°–115° C. Crystallization of the solid from pentane gave white crystals of 2-methoxy-3,6-dichlorobenzoic acid melting at 114°–116° C., and having the following elemental analysis as calculated for $C_8H_6Cl_2O_3$.

Theoretical: C, 43.47%; H, 2.74%; Cl, 32.09%. Found: C, 43.41%; H, 2.80%; Cl, 31.88%.

EXAMPLE 2

*Preparation of 2-methoxy-3,6-dichloro-5-nitrobenzoic acid*

2-methoxy-3,6-dichlorobenzoic acid (60 g.; 0.27 mole) prepared as described in Example 1, was dissolved in concentrated sulfuric acid (200 ml.), and the solution placed into a 500 ml. two-neck, round-bottom flask fitted with a mechanical stirrer, addition funnel and thermometer. The mixture was cooled to 4° C. in an ice bath and 70% nitric acid (50 ml.) was added through the addition funnel over a 90 minute period, while the temperature of the mixture was held in the 4°–10° C. range. The reaction mixture was then poured over 600 ml. ice to yield a precipitate, which was separated from the aqueous mixture by filtering with suction. The precipitate was washed with cold water and recrystallized from a 50% toluene-50% hexane mixture to obtain pale yellow solid crystals of 2-methoxy-3,6-dichloro-5-nitrobenzoic acid having a melting point of 150°–152° C. and the following elemental analysis as calculated for $C_8H_5Cl_2NO_5$.

Theoretical: C, 36.12%; H, 1.89%; Cl, 26.65%; N, 5.26%. Found: C, 35.82%; H, 2.01%; Cl, 27.01%; N, 5.18%.

EXAMPLE 3

*Preparation of 2-methoxy-5-amino-3,6-dichlorobenzoic acid (compound I)*

2-methoxy-5-nitro-3,6-dichlorobenzoic acid (45 g.; 0.17 mole) was dissolved in ethanol (375 ml.). The resulting solution was divided into 3 equal portions and each portion placed into a 250 ml. glass pressure bottle. Activated Raney nickel catalyst (approximately 5 g.) was added to each bottle, which was placed in a Parr rocking hydrogenation apparatus, flushed with nitrogen gas, and pressured to 40 pounds per square inch pressure with hydrogen gas. The pressure was maintained in the bottles by repressuring at intervals with hydrogen gas to 40 pounds per square inch. The bottles were rocked for two hours until a total of 12 pounds per square inch of hydrogen pressure was utilized. The contents of the bottles were combined, filtered to remove the catalyst, and allowed to stand. The resulting solution was poured into water (500 ml.) and extracted with three portions of anhydrous diethyl ether. The ether extracts were combined, washed with water, dried over anhydrous magnesium sulfate which was then removed by filtration, and boiled with activated charcoal, which was also removed by filtration. The diethyl ether was removed by distillation in vacuo on a steam bath to yield the desired compound I as an almost white crystalline solid residue, which after crystallization from benzene-pentane mixture melted at 163–165° C., and had the following elemental analysis as calculated for $C_8H_7Cl_2O_3N$.

Theoretical: C, 40.70%; H, 2.99%; Cl, 30.04%; N, 5.93%. Found: C, 41.12%; H, 3.25%; Cl, 29.66%; N, 5.73%.

EXAMPLE 4

*Preparation of the sodium salt of compound I*

Compound I (0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold, dry ether, filtered, pressed dry, and dried completely in a vacuum oven to give the desired sodium salt of compound I.

EXAMPLE 5

*Preparation of the ammonium salt of compound I*

Treatment of compound I (0.5 mole) in 500 cc. of methanol with 34 cc. of commercial concentrated ammonium hydroxide according to the method given in the previous example gives the desired ammonium salt of compound I.

EXAMPLE 6

*Preparation of the dimethylamine salt of compound I*

Compound I (0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of compound I.

EXAMPLE 7

*Preparation of diethanolamine salt of compound I*

In the manner described in the previous example, compound I (0.5 mole) is treated with diethanolamine (52.5 g.; 0.5 mole) in 500 cc. of dry ether. The product which is isolated is the diethanolamine salt of compound I.

EXAMPLE 8

*Preparation of the morpholine salt of compound I*

Compound I (0.5 mole) is treated with morpholine (43.5 g.; 0.5 mole) in 500 cc. of ether, and the product is worked up as described for the preparation of the dimethylamine salt to give the desired morpholine salt of compound I.

EXAMPLE 9

*Preparation of the ethyl ester of compound I*

Compound I (0.7 mole) is dissolved in absolute ethyl alcohol (500 ml.). The solution is saturated with anhydrous hydrogen chloride gas over a period of 10 hours. The saturated solution is allowed to stand for about 24 hours, and is then cooled and mixed with 10% sodium carbonate solution to recover the ester. The ester is washed with water and dried to give the desired ethyl ester of compound I.

EXAMPLE 10

*Preparation of an emulsifiable concentrate of Compound I*

The following concentrate is prepared by mixing the ingredients intimately in the given percentage proportions by weight:

| | Percent |
|---|---|
| Compound I | 25 |
| Antarox A–400 | 40 |
| Methanol | 35 |

"Antarox A–400" is the trade name under which a nonionic detergent of the aromatic polyethylene glycol ether type is sold. The above concentrate is diluted with water to the desired concentration for use.

EXAMPLE 11

*Preparation of an emulsifiable concentrate of the n-butyl ester of compound I*

The following ingredients are mixed thoroughly in the given percentage proportions by weight:

| | Percent |
|---|---|
| n-Butyl ester of compound I | 59 |
| Xylene | 10 |
| Triton X-100 | 5 |
| Kerosene | 26 |

"Triton X–100" is the trade name under which an emulsifier of the alkyl aryl polyether alcohol type is sold. The above concentrate is diluted with water to the desired concentration for use.

EXAMPLE 12

*Preparation of a dust from the sodium salt of compound I*

The sodium salt of compound I (10% by weight) and talc (90% by weight) are combined and ground to the desired particle size in a mechanical grinder-blender.

The herbicidal activity of chemical compounds is often demonstrated by the ability of the chemicals to kill or arrest the growth of tomato plants, or weeds, such as those previously named. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention, for example, can be demonstrated in greenhouse experiments on young potted tomato plants (Bonny Best variety). The compounds are formulated into 10 percent wettable powders and are dispersed in water at a concentration of 2,000 parts per million actual chemical. Ten milliliters of an aliquot portion of the dispersion is added to the soil surface of the tomato plants, approximately 5 to 7 inches tall. In order to avoid undue concentration or accumulation of the chemical in any given area, 5 holes the size of a pencil and about 1 inch deep are punched in the soil surface around the shoot, and the 10 milliliter application is divided equally among the 5 holes. Three plants are used for each application. The treated plants are held under greenhouse conditions for 7 days, provided with subterranean watering, and observed for response to treatment. The results indicate a high order of herbicidal toxicity of the compounds of this invention.

In order to further establish the herbicidal activity of the present compounds the following tests were performed with 2-methoxy-3,6-dichloro-5-aminobenzoic acid:

Small greenhouse flats filled with dry soil were seeded with foxtail, ryegrass or corn. About 24 hours after seeding the test compound formulated as an aqueous emulsion of acetone solution containing inactive emulsifiers was sprayed at rates of 2 pounds per acre and 8 pounds per acre onto the surface of the soil. After spraying, the soil containers were placed in the greenhouse and provided with supplementary light, heat and water. The plants were maintained under these conditions for a period of twenty days, at which time the degree of injury to the plants was rated on a scale of 0 to 10, with 0 denoting no injury and 10 denoting total death. The results of this testing are as follows:

| Test Species | Concn., lbs. per acre | Injury Rating |
|---|---|---|
| Ryegrass | 8 | 9 |
| Foxtail | 2 | 8 |
| Foxtail | 8 | 10 |
| Corn | 2 | 0 |
| Corn | 8 | 2 |

I claim:
1. A herbicidal composition comprising an inert carrier and at least about 5% by weight a compound selected from the group consisting of 2-methoxy-3,6-dichloro-5-aminobenzoic acid, its esters in which the esterifying group is an unsubstituted alkyl group which contains from 1 to 10 carbon atoms, its alkali metal salts and its amine salts in which the amine component contains up to 6 carbon atoms.

2. A method of destroying undesirable plants, which comprises contacting said plants with a herbicidal composition comprising an inert carrier and as the essential active ingredient, in a herbicidal quantity which is injurious to said plant a compound selected from the group consisting of 2-methoxy-3,6-dichloro-5-aminobenzoic acid, its esters in which the esterifying group is an unsubstituted alkyl group which contains from 1 to 10 carbon atoms, its alkali metal salts, and its amine salts in which the amine component contains up to 6 carbon atoms.

References Cited

UNITED STATES PATENTS

| 2,394,916 | 2/1946 | Jones | 71—2.6 |
| 3,013,051 | 12/1961 | Richter | 71—2.6 X |
| 3,248,208 | 4/1966 | Weil | 71—2.6 |

LEWIS GOTTS, *Primary Examiner.*

JAMES O. THOMAS, JR., *Examiner.*